United States Patent [19]

Gauert et al.

[11] Patent Number: 4,540,284

[45] Date of Patent: Sep. 10, 1985

[54] RING LASER INCLUDING REFLECTING MIRROR WITH PHASE ROTATING GARNET LAYER

[75] Inventors: Rolf Gauert, Brunswick; Werner W. Jungbluth, Munster, both of Fed. Rep. of Germany

[73] Assignee: Deutsch Forschungs- und Versuchsanstalt für Luft- und Raumfahrt e. V., Cologne, Fed. Rep. of Germany

[21] Appl. No.: 368,573

[22] Filed: Apr. 15, 1982

[30] Foreign Application Priority Data

Apr. 21, 1981 [DE] Fed. Rep. of Germany ....... 3115906

[51] Int. Cl.$^3$ .............................................. G01C 19/64
[52] U.S. Cl. .................... 356/350; 350/377; 356/351
[58] Field of Search ................ 356/350, 351; 350/375, 350/377, 378; 372/95, 105, 106, 94

[56] References Cited

U.S. PATENT DOCUMENTS

| 4,141,651 | 2/1979 | Smith et al. | 356/350 |
| 4,195,908 | 4/1980 | Kestigian et al. | 356/350 |
| 4,222,668 | 9/1980 | Henry | 356/350 |
| 4,246,549 | 1/1981 | Carter et al. | 356/350 |

OTHER PUBLICATIONS

Southwell, "Multilayer Coating Design Achieving a Broadband 90° Phase Shift", Applied Optics, vol. 19, No. 16, Aug. 15, 1980, pp. 2688-2692.

*Primary Examiner*—Vincent P. McGraw
*Attorney, Agent, or Firm*—Gottlieb, Rackman & Reisman

[57] ABSTRACT

A ring laser having at least three corner mirrors, of which one carries a ferromagnetic garnet layer on a substrate and is coated with a plurality of interference layers and magnetized at right angles to the ferromagnetic garnet layer. The ring laser is designed in such a way that the corner mirror which carries the ferromagnetic garnet layer acts in reflection as a Faraday cell and, in particular, in that the ferromagnetic garnet layer is subjected to circularly polarized radiation. The circularly polarized radiation may be produced by arranging in front of the corner mirror which carries the ferromagnetic garnet layer a λ/4 retarding plate. Another possibility consists in providing those corner mirrors which in the radiation path are adjacent to the corner mirror which carries the ferromagnetic garnet layer with a plurality of interference layers which are arranged in such a way that circularly polarized radiation is converted into linearly polarized radiation by means of a 90° phase shift and vice versa.

4 Claims, 4 Drawing Figures

RING LASER INCLUDING REFLECTING MIRROR WITH PHASE ROTATING GARNET LAYER

FIELD OF THE INVENTION

The invention concerns a ring laser having at least three corner mirrors one of which carries on a substrate a layer of ferromagnetic garnet which is coated with a plurality of interference layers and which is magnetised at right angles to the layer.

DESCRIPTION OF THE PRIOR ART

In a known ring laser of this type (Neacon-Report 1978, pp 544–548) a magneto-optical bias is applied to the carrier mirror which carries the ferromagnetic garnet layer by utilising the transverse Kerr effect referred to in that report.

It is an object of the invention to design the ring laser in such a way that the corner mirror carrying the ferromagnetic garnet layer acts in reflection as a Faraday cell.

SUMMARY OF THE INVENTION

This object is solved according to the invention in that the corner mirror carrying the ferromagnetic garnet layer is subjected to circularly polarised radiation. In order to excite the circularly polarised radiation, a λ/4 retarding plate may be arranged in front of the corner mirror which carries the ferromagnetic garnet layer. In another embodiment those corner mirrors which, in the path of the radiation, are adjacent to the corner mirror which carries the ferromagnetic garnet layer may be provided with a plurality of interference layers arranged in such a way that circularly polarised radiation is converted, by a 90° phase shift, into a linearly polarised radiation and vice versa.

BRIEF DESCRIPTION OF THE DRAWINGS

An example in accordance with the invention is illustrated in the drawings and is described in detail in the following with reference to the drawings, in which.

DESCRIPTION OF THE PREFERRED EMBODIMENTS

Figure 1:
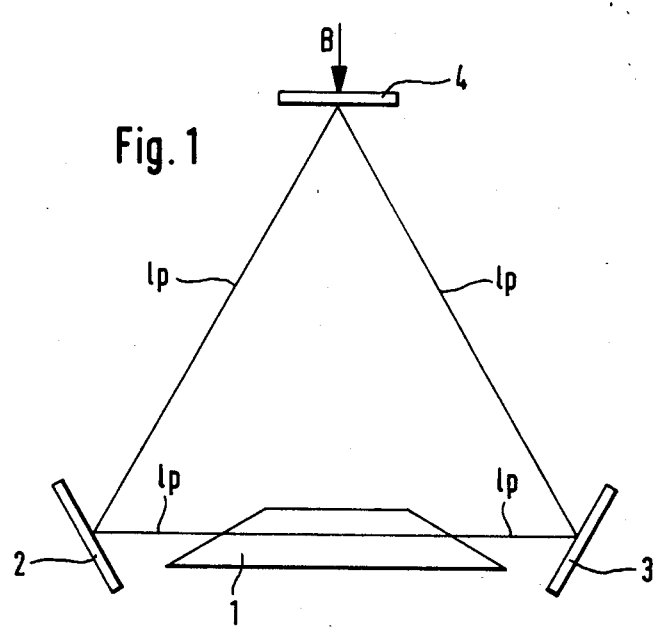
FIG. 1 shows the principle of a ring laser such as formed the basis of the invention.

The ring laser illustrated in FIG. 1 operates with three corner mirrors 2, 3 and 4 and an amplification medium in the form of a gas discharge tube 1 arranged between the two corner mirrors 2 and 3.

The corner mirror 4 is so designed that the desired bias is produced by means of it. The corner mirrors 2 and 3 are mirrors of high reflectivity.

Figure 2:
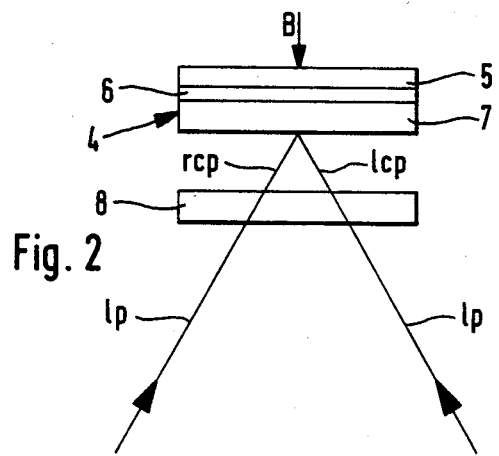
FIG. 2 shows, in a schematic representation, a corner mirror acting according to the invention as a Faraday mirror.
Figure 3:
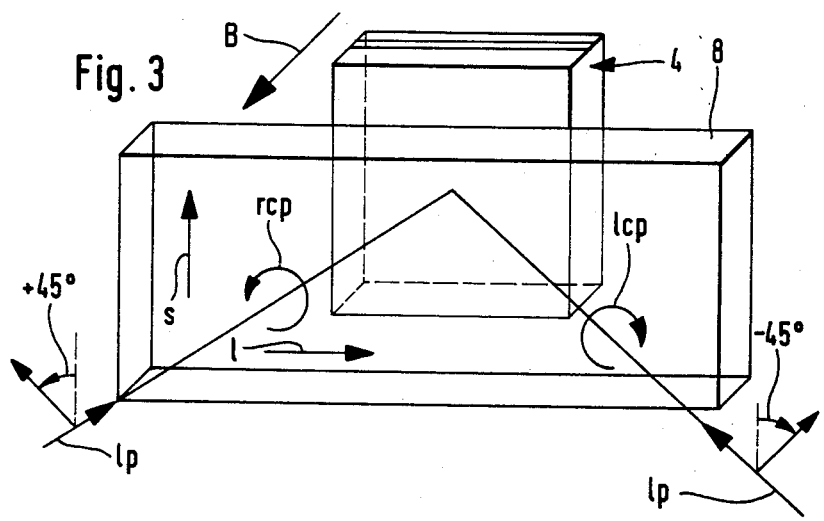
FIG. 3 shows the arrangement according to FIG. 2 in a perspective representation.

The corner mirror 4 carries on a substrate 5 a ferromagnetic layer 6, transparent to radiation, of a garnet compound, for example yttrium-iron-garnet (YIG). YIG has a high Verdet constant. Other ferromagnetic garnet compounds with high Verdet constants may, however, also be considered. The garnet layer 6 may be mirror-coated on its rear side. The garnet layer 6 has a reflecting power which is insufficient for a ring laser. Therefore, a plurality of dielectric interference layers 7 by means of which the necessary reflectivity is achieved are applied to this layer. A λ/4 plate 8 which is represented in FIGS. 2 and 3 as if it were at a distance for the purpose of illustration of the effect of this plate on the rotating beam is applied against the outermost layer of the interference layers 7. The corner mirror 4 is acted on by a magnetic field B by means of which the layer 6 is magnetised at right angles to its plane. The corner mirror 4 acts as a Faraday mirror in which the magneto-optical Faraday effect is utilised. The Faraday effect makes itself apparent as a rotation of the plane of polarisation of linearly polarised light which is based on a phase shift of the circular waves. The corner mirror 4 acts in reflection and requires only a λ/4 retarding plate through which both rotating beams pass. The azimuth of the plane of polarisation of the radiation incident from the left or from the right is +45° or −45° to the perpendicular. Behind the λ/4 plate right-circular polarised (rcp) or left-circular polarised (lcp) light is produced. This light strikes the mirror 4 magnetised at right angles to its surface. Here the rcp-radiation undergoes the phase shift $-\phi_r$, since it is moving in the opposite direction to the magnetic field, and after reflection at the back of the mirror, the phase shift $+\phi_1$, since it is transformed by reflection into lcp-light. The resulting phase shift in the circular wave indicent from the left is thus $\delta_1$:

(1) $\delta_1 = \phi_1 - \phi_r = 2\theta_F$ where $\theta F$ = Faraday angle of rotation
The light incident from the right undergoes the same changes with the signs reversed. Here $\delta_2$ is (3) $\delta_2 = \phi_r - \phi_1 = -2\theta_F$ The resulting phase shift $\Delta$ between the two waves is given by (5) $\Delta = \delta_1 - \delta_2 = 4\theta_F.$ The bias which can be achieved by means of the Faraday mirror 4 depends on the number of the dielectric interference layers applied in order to produce the necessary reflectivity. Calculations show that with a layer thickness of 5 μm with epitaxially grown layers a bias of ±17°/s can be achieved, with a reflectivity of approximately 99.4%. With samples of YIG, mirror-coated on the rear, having a thickness of 5 μm, theoretical values of ±67°/s are reached for a reflectivity of 99.4%.

A λ/4 retarding plate may be omitted if there are used as corner mirrors adjacent the Faraday mirror, mirrors which produce a phase shift of 90° between p and s components. Such an arrangement is illustrated in FIG. 4.

Figure 4:
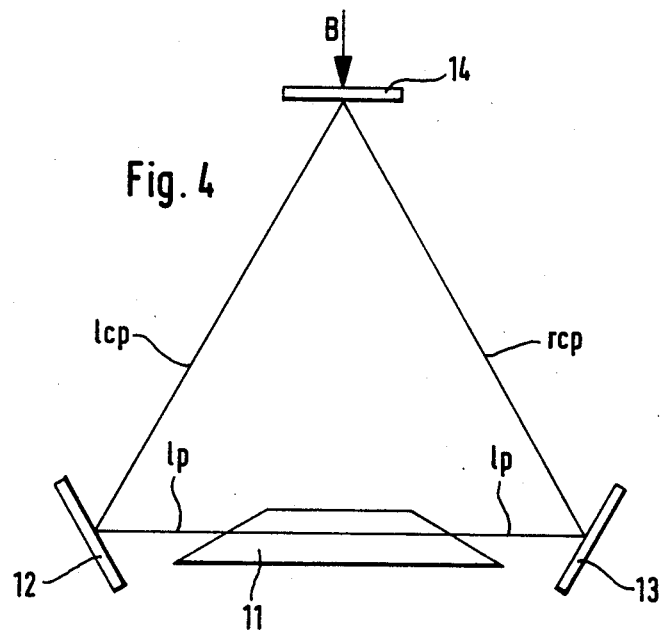
FIG. 4 shows a ring laser in a modified embodiment.

The construction of the corner mirror 14 in FIG. 4 corresponds with the construction of the corner mirror 4 as described hereinbefore without the λ/4 plate arranged in front of it. The phase shift by means of the corner mirrors 12 and 13 is brought about by means of a suitable arrangement of the dielectric multilayer construction (Applied Optics, Volume 19, No. 16/15, August 1980). As can be seen in FIG. 4, the radiation p, polarised linearly (lp) and emitted in the clockwise direction by the gas discharge tube 11, is transformed by means of the mirror 12 into left circularly polarised radiation (lcp) which is incident on the Faraday mirror 14, leaves this as right circularly polarised radiation (rcp) and is again transformed by a phase shift by means of the mirror 13 into linearly polarised (lp) radiation. The radiation rotating anticlockwise is changed in its polarisation in accordance with the phase shift. While the radiation rotating clockwise passes through the states lp/lcp/rcp/lp, the order of the states for the radiation rotating in the anticlockwise direction is lp/rcp/lcp/lp.

What we claim as our invention and desire to secure by Letters Patent of the United States is:

1. A ring laser having at least three corner mirrors of which one requires circularly polarised light to be incident thereon, said one corner mirror including a substrate having a ferromagnetic garnet layer thereon, the garnet layer being magnetised to saturation in a direction perpendicular to that layer, and a plurality of superimposed highly reflecting interference layers on the surface of the garnet layer facing the incident circularly polarised light, the interference layers having a reflectivity of approximately 99.4% and permitting approximately 0.6% of the incident light to pass through into the garnet layer, the passed small fraction of the light being sufficient to enable the desired bias or phase shift to be achieved.

2. A ring laser according to claim 1 in which a $\lambda/4$ retarding plate is arranged in front of said one corner mirror which carries the ferromagnetic garnet layer and parallel to it to convert linearly polarised light into circularly polarised light.

3. A ring laser according to claim 1, in which the corner mirrors which are adjacent in the radiation path to said one corner mirror which carries the ferromagnetic garnet layer are provided with a plurality of highly reflecting interference layers which are arranged in such a way that said adjacent corner mirrors transform linearly polarised radiation into circularly polarised radiation and vice versa by a 90° phase shift.

4. A ring laser according to claim 1, in which a mirror coating is provided on the surface of the garnet layer which faces the substrate.

* * * * *